United States Patent
Lin et al.

(10) Patent No.: US 11,940,060 B2
(45) Date of Patent: Mar. 26, 2024

(54) SEAL RING STRUCTURE FOR LOW TORQUE VALVE FIRE-SAFE

(71) Applicant: METAL INDUSTRIES RESEARCH & DEVELOPMENT CENTRE, Kaohsiung (TW)

(72) Inventors: Ching-An Lin, Kaohsiung (TW); Chin-Kang Chen, Kaohsiung (TW); Chia-Ho Cheng, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 17/882,051

(22) Filed: Aug. 5, 2022

(65) Prior Publication Data
US 2023/0151893 A1    May 18, 2023

(30) Foreign Application Priority Data
Nov. 16, 2021 (TW) ................................. 110213506

(51) Int. Cl.
F16K 5/06        (2006.01)
(52) U.S. Cl.
CPC ................................. F16K 5/0689 (2013.01)

(58) Field of Classification Search
CPC .... F16K 5/0689; F16K 5/0271; F16K 5/0471; F16K 5/10; F16K 5/12
See application file for complete search history.

(56) References Cited

U.S. PATENT DOCUMENTS

| | | | | |
|---|---|---|---|---|
| 5,287,889 A | * | 2/1994 | Leinen | F16K 47/045 137/625.3 |
| 7,850,143 B1 | * | 12/2010 | Rosada | F16K 5/0631 251/316 |
| 9,249,889 B1 | * | 2/2016 | Anderson | F16K 5/205 |
| 9,657,848 B2 | * | 5/2017 | Balan | F16K 5/0673 |

FOREIGN PATENT DOCUMENTS

| | | | | |
|---|---|---|---|---|
| CA | 2643775 C | * | 9/2011 | F16J 15/028 |
| WO | WO-2020236063 A1 | * | 11/2020 | F16K 27/00 |

* cited by examiner

Primary Examiner — Hailey K. Do
(74) Attorney, Agent, or Firm — WPAT, P.C.

(57) ABSTRACT

The present invention provides a seal ring structure, which comprises a seal ring member. The seal ring member includes a first ring opening on one side and a second ring opening on the other. A periphery of the first ring opening includes a plurality of leak grooves. When the seal ring member and the valve ball squeeze each other, the plurality of leak grooves can reduce the torque required to rotate the valve ball. A leak-groove length of the plurality of leak grooves is smaller than a seal-ring-member length of the seal ring member. The plurality of leak grooves do not penetrate the seal ring member for avoiding leakage of fluid.

8 Claims, 6 Drawing Sheets

SEAL RING STRUCTURE FOR LOW TORQUE VALVE FIRE-SAFE

FIELD OF THE INVENTION

The present invention relates generally to a seal ring structure, and particularly to a seal ring member using a plurality of leak grooves for reducing the torque required to rotate valve balls.

BACKGROUND OF THE INVENTION

The industry is the main support of economics. Most industries feature complicated production processes. Most raw materials adopted in the production processes, semi-finished products, and products are flammable and explosive, possibly leading to fire and explosion events.

The valves used in easily ignitable scenarios might have potential danger in fire. Generally, the valves used in these scenarios should be specially designed so that the valves still maintain certain sealing and operation properties after fire burn for a certain period. To measure the flame tolerance of valves, the fire type-test is an important index.

A general valve fire type-test requires:
1. Increasing or stabilizing the pressure to a high test pressure: Under the test pressure, operate the valve under test to the fully open position.
2. Operability: After a fire type-test, uses an operational shaft installed at the valve under test to open the value fully from the closed position with high test pressure without using wrenches or extended shafts.

After performing fire type-test (30 minutes) on the refractory ball valve according to the prior art, since the valve ball in the valve has contacted and squeezed the metal fire-lip and due to high pressure difference on both sides of the valve ball, the valve ball will contact the metal fire-lip tightly. Then the valve cannot be opened or closed manually. Consequently, the requirement of operability in a fire type-test cannot be satisfied.

To solve the above problem according to the prior art, the present invention provides a seal ring structure which can reduce the torque required to rotate valve balls after a fire type-test. Thereby, the requirement of operability in a fire type-test can be satisfied.

SUMMARY

An objective of the present invention is to provide a seal ring member. A first ring opening of the seal ring member includes a plurality of leak grooves on the periphery. When seal ring member and the valve ball squeeze each other, the plurality of leak grooves can reduce the torque required to rotate the valve ball.

To achieve the above objective and efficacy, the present invention provides a seal ring member, which includes a first ring opening on one side and a second ring on the other side. The first ring opening includes a plurality of leak grooves on a periphery. The length of each of the plurality of leak grooves is smaller than a ring length of the seal ring member. By using the seal ring structure, the torque required to rotate the valve ball can be reduced after a fire type-test.

According to an embodiment of the present invention, the seal ring structure further comprises a valve side lid, a ball pad ring, and a valve ball. The valve side lid includes a first connecting side and a second connecting side. The first connecting side is used for disposing the seal ring member. One side of the ball pad ring is disposed against the valve side lid and the seal ring member. The valve ball is disposed on the other side of the ball pad ring.

According to an embodiment of the present invention, the seal ring structure further comprises a valve body with one side disposed at the valve side lid. A linkage member passes through the top of the valve body. A support part is disposed at the bottom inside the valve body.

According to an embodiment of the present invention, the valve ball is disposed inside the valve body. The valve ball is disposed below the linkage member and on the support part.

According to an embodiment of the present invention, a first diameter of the first ring opening is smaller than a second diameter of the valve ball.

According to an embodiment of the present invention, the periphery of the first ring opening includes a contact surface corresponding to the valve ball. The plurality of leak grooves pass through the contact surface.

According to an embodiment of the present invention, the number of the plurality of leak grooves is even. In addition, the plurality of leak grooves are disposed symmetrically.

According to an embodiment of the present invention, the plurality of leak grooves are curved, respectively.

According to an embodiment of the present invention, the plurality of leak grooves are triangular, respectively.

DETAILED DESCRIPTION

In order to make the structure and characteristics as well as the effectiveness of the present invention to be further understood and recognized, the detailed description of the present invention is provided as follows along with embodiments and accompanying figures.

To solve the problem according to the prior art as described above, the present invention provides a seal ring member with a plurality of leak grooves on a periphery of the first ring opening. When the seal ring member and the valve ball squeeze each other, the plurality of leak grooves can reduce the torque required to rotate the valve ball and hence avoiding inability of manual opening and closing of the valve, which is caused by tight contact between the valve ball and the metal fire-lip due to high pressure difference on both sides of the valve ball after the valve is heated. Inability of manual opening and closing of valves leads to incompliance of fire type-test.

Figure 1:
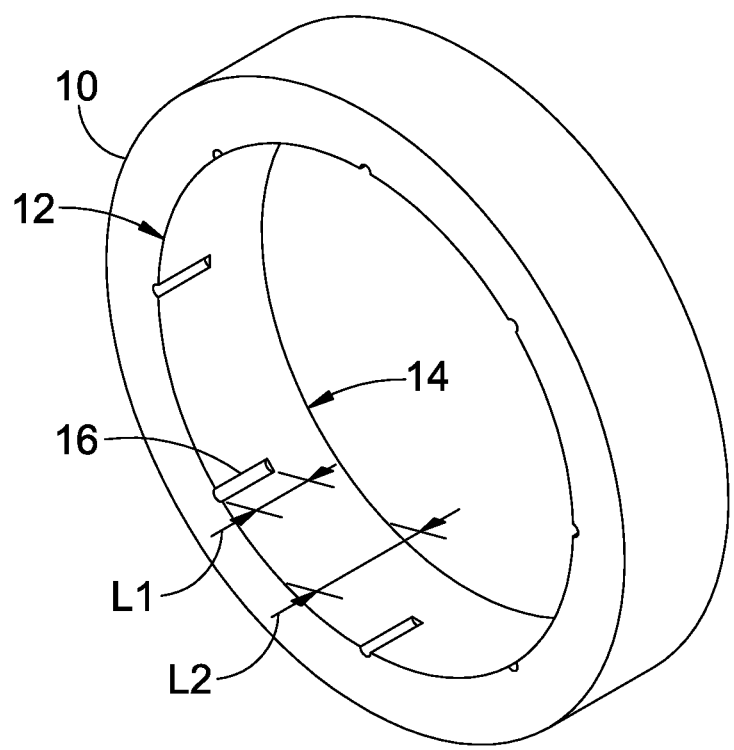
FIG. 1 shows a stereoscopic structure according to an embodiment of the present invention.

Please refer to FIG. 1, which shows a stereoscopic structure according to an embodiment of the present invention. As shown in the figure, the present embodiment provides a seal ring structure comprising a seal ring member 10. According to the present embodiment, the seal ring member 10 is disposed inside the valve and replaces the fire-lip of the valve.

Please refer to FIG. 1 again. As shown in the figure, according to the present embodiment, the seal ring member 10 includes a first ring opening 12 on one side and a second ring opening 14 on the other. The first ring opening 12 communicates with the second ring opening 14 and forming a channel. A periphery of the first ring opening 12 includes a plurality of leak grooves 16. A leak-groove length L1 of each of the plurality of leak grooves 16 is smaller than a seal-ring-member length L2 of the seal ring member 10 so that the plurality of leak grooves 16 do not penetrate the seal ring member 10. According to the present embodiment, the material of the seal ring member 10 is metal, such as stainless steel or heat tolerant alloys. Nonetheless, the present embodiment is not limited to the examples.

According to the present embodiment, the number of the plurality of leak grooves 16 is even. In addition, the plurality of leak grooves 16 are disposed symmetrically for enabling uniform force distribution on the seal ring member 10 and avoiding damages owing to fatigue.

According to the present embodiment, the plurality of leak grooves 16 of the seal ring member 10 are curved, respectively.

Figure 2:
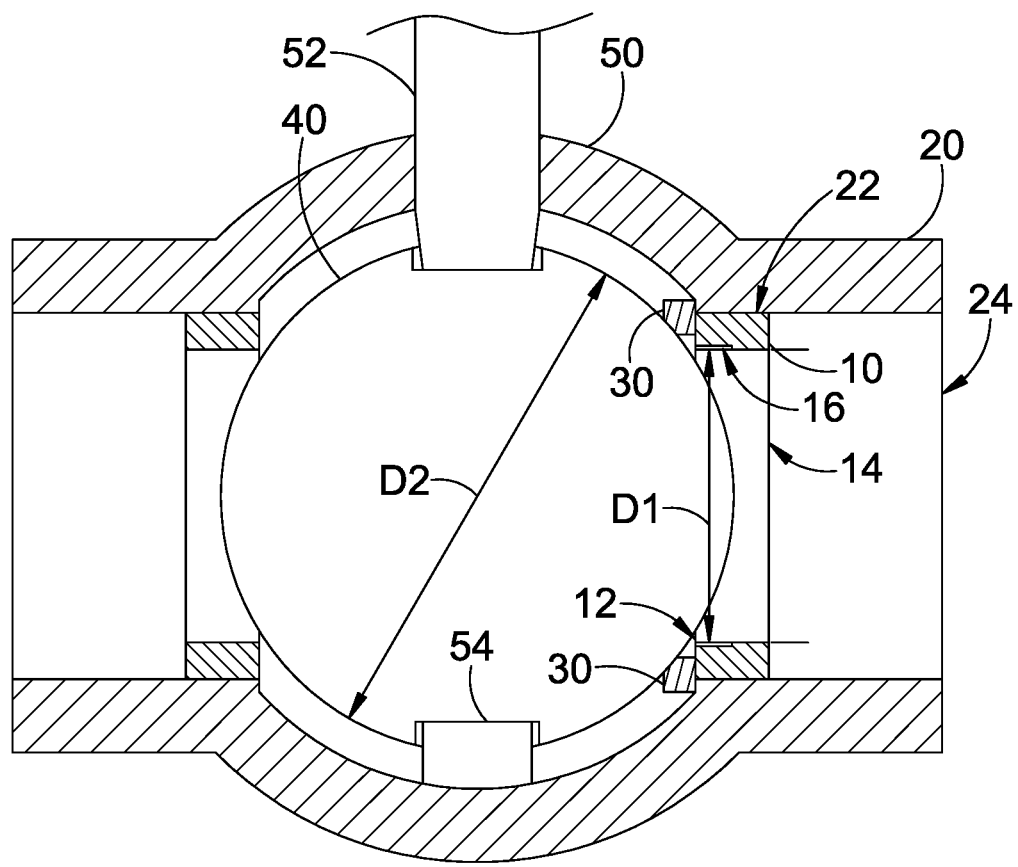
FIG. 2 shows a cross-sectional view of the valve structure according to an embodiment of the present invention.

Please refer to FIG. 1 again and to FIG. 2, which shows a cross-sectional view of the valve structure according to an embodiment of the present invention. As shown in the figures, according to the present embodiment, the seal ring structure further comprises a valve side lid 20, a ball pad ring 30, and a valve ball 40. The valve side lid 20 includes a first connecting side 22 on one side for disposing the seal ring member 10. The valve side lid 20 includes a second connecting side 24 on the other side. The first connecting side 22 and the second connecting side 24 are communicated to form a channel. The channel formed by communicating the first ring opening 12 and the second ring opening 14 of the seal ring member 10 and the channel formed by communicating the first connecting side 22 and the second connecting side 24 are communicated. One side of the ball pad ring 30 is disposed against the valve side lid 20 and the seal ring member 10. The valve ball 40 is disposed on the other side of the ball pad ring 30. The ball pad ring 30 is used for buffering the contact between the seal ring member 10 and the valve ball 40 for preventing mutual rubbing there between, which will reduce the usage lifetime.

According to the present embodiment, the seal ring structure further comprises a valve body 50 with one side disposed at the valve side lid 20. A linkage member 52 passes through the top of the valve body 50. A support part 54 is disposed at the bottom inside the valve body 50. According to the present embodiment, the valve ball 40 is disposed inside the valve body 50. The valve ball 40 is disposed below the linkage member 52 and on the support part 54. According to the present embodiment, when the linkage member 52 is rotated, the valve ball 40 will be driven to rotate accordingly. The support part 54 is used for supporting the valve ball 40 and allowing the valve ball 40 to rotate thereon.

According to the present embodiment, a first diameter D1 of the first ring opening 12 of the seal ring member 10 is smaller than a second diameter D2 of the valve ball 40 for preventing the valve ball 40 from falling into the seal ring member 10.

Figure 3A:
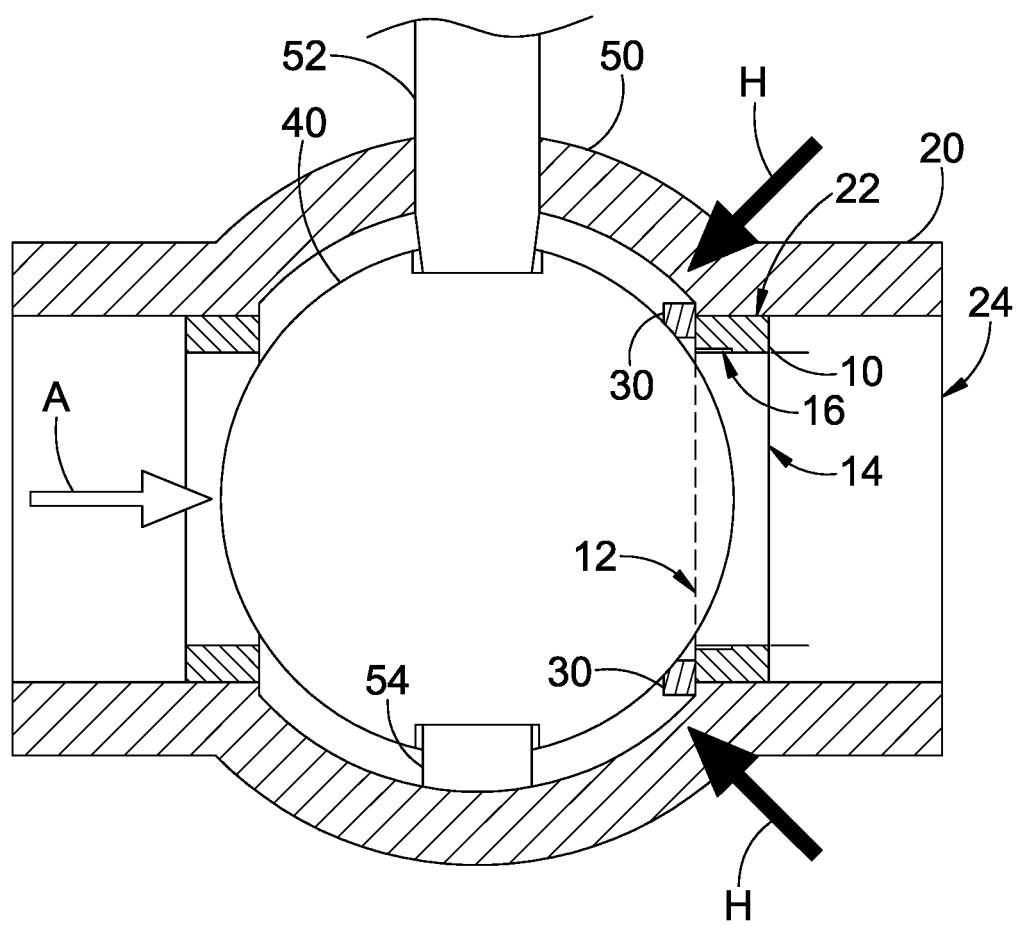
FIG. 3A to FIG. 3B show schematic diagrams of the operations according to an embodiment of the present invention.
Figure 3B:
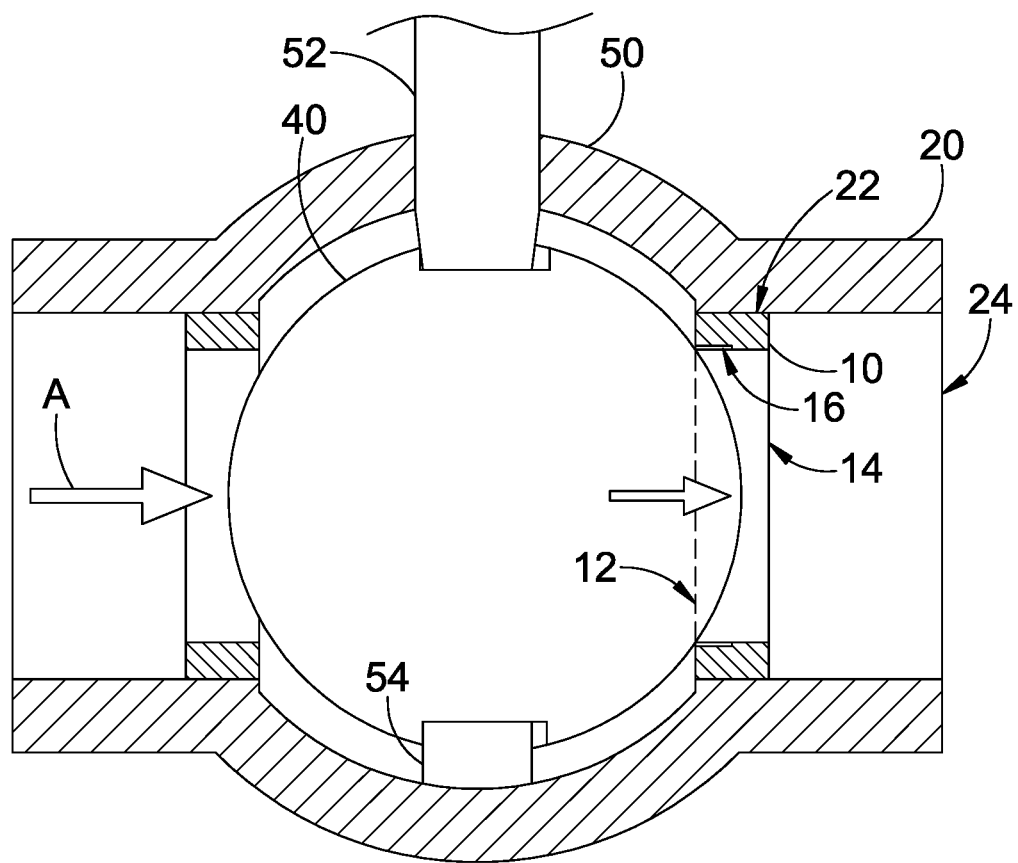

Please refer to FIG. 3A to FIG. 3B, which show schematic diagrams of the operations according to an embodiment of the present invention. As shown in the figures, according to the present embodiment, in a fire type-test, the valve side lid 20 and the valve body 50 are burned and heated. The valve side lid 20 and the valve body 50 are heated by receiving heat H. Once the ball pad ring 30 inside the valve body 50 is burned and removed (for example, by melting), the space will be created for the ball pad ring 30. The valve ball 40 is squeezed by a fluid A from the upstream, making the valve ball 40 to move toward and contact the seal ring member 10. According to the present embodiment, to re-rotate the valve ball 40, the plurality of leak grooves 16 of the seal ring member 10 can reduce the torque to rotate the linkage member 52 correspondingly.

Figure 4:
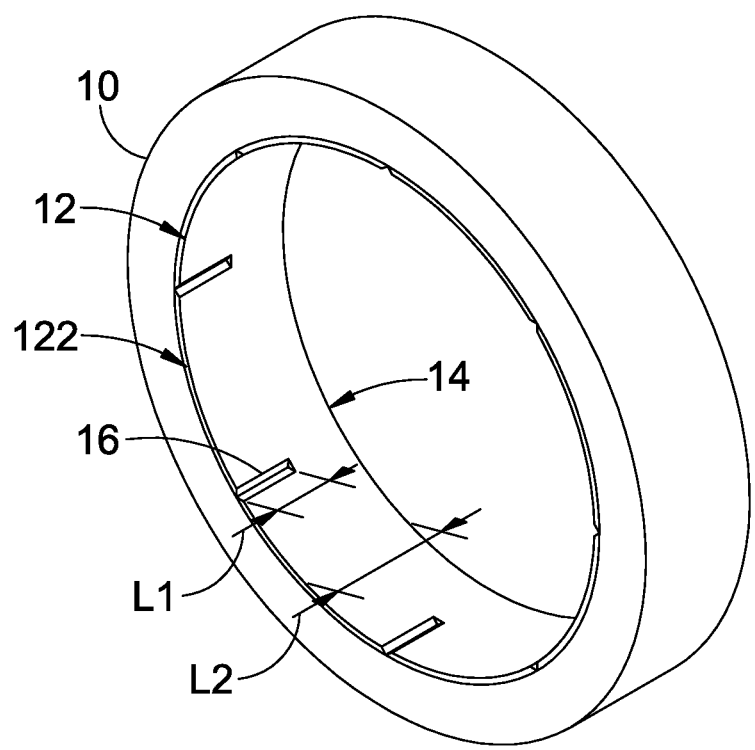
FIG. 4 shows a schematic diagram of the leak groove structure according to another embodiment of the present invention.
Figure 5:
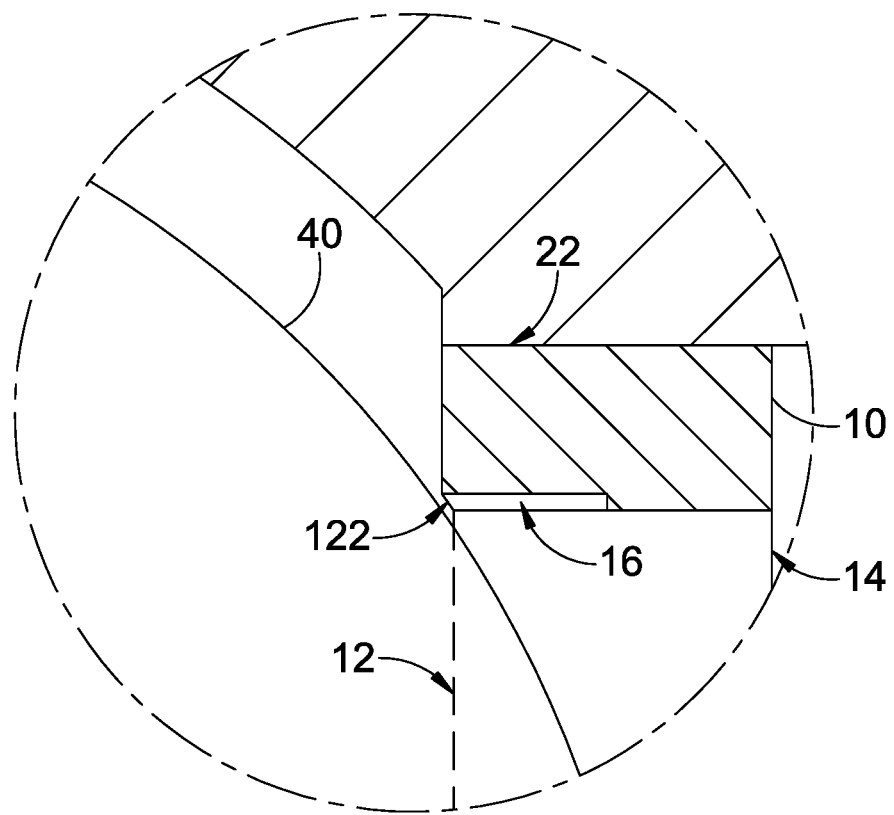
FIG. 5 shows an enlarged view according to another embodiment of the present invention.

Please refer to FIG. 4 and FIG. 5. FIG. 4 shows a schematic diagram of the leak groove structure according to another embodiment of the present invention; FIG. 5 shows an enlarged view according to another embodiment of the present invention. As shown in the figures, according to the present embodiment, the periphery of the first ring opening 12 includes a contact surface 122 corresponding to the valve ball 40. The plurality of leak grooves 16 pass through the contact surface 122. The contact surface 122 corresponds to the curved surface of the valve ball 40. When the valve ball 40 contacts the contact surface 122, the valve ball 40 perfectly fits the contact surface 122. According to the present embodiment, the plurality of leak grooves 16 of the seal ring member 10 are triangular, respectively. Different shapes of the plurality of leak grooves 16 can be adopted to adapt to different valves and valve balls.

The seal ring structure according to the present embodiment can include the leak grooves with the required number and size. It can achieve sealing after combustion, as well as reducing the operational torque by preventing high pressure difference. Thereby, the situation of inability in re-operating valves and valve balls can be avoided.

To sum up, the present invention provides a seal ring structure with a plurality of leak grooves on a periphery of the ring opening. The number and size of the plurality of leak grooves can be designed according to the requirements. When the seal ring member and the valve ball squeeze each other after a fire type-test, the plurality of leak grooves can reduce the torque required to rotate the valve ball and hence avoiding inability of manual opening and closing of the valve, which is caused by tight contact between the valve ball and the metal fire-lip due to high pressure difference on both sides of the valve ball after the valve is heated. Inability of manual opening and closing of valves leads to incompliance of fire type-test.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A seal ring structure, comprising:
    a seal ring member including a first ring opening on one side and a second ring opening on another side, a periphery of said first ring opening including a plurality of leak grooves, and a length of said plurality of leak grooves being smaller than a ring length of said seal ring member;
    a valve side lid including a first connecting side on one side for disposing said seal ring member, and including a second connecting side on another side;
    a ball pad ring having one side disposed against said valve side lid and said seal ring member; and
    a valve ball disposed on another side of said ball pad ring.

2. The seal ring structure of claim 1, wherein a first diameter of said first ring opening is smaller than a second diameter of said valve ball.

3. The seal ring structure of claim 1, wherein said first ring opening includes a contact surface on said periphery corresponding to said valve ball; and said plurality of leak grooves pass through said contact surface.

4. The seal ring structure of claim 1, wherein a number of said plurality of leak grooves is even; and the plurality of leak grooves are disposed symmetrically.

5. The seal ring structure of claim 1, wherein said plurality of leak grooves are curved, respectively.

6. The seal ring structure of claim 1, wherein said plurality of leak grooves are triangular, respectively.

7. The seal ring structure of claim 1, and further comprising a valve body, with one side connected with said valve side lid, including a linkage member passing through the top of said valve body, and including a support part disposed at the bottom inside said valve body.

8. The seal ring structure of claim 7, wherein said valve ball is disposed inside said valve body; said valve ball is disposed below said linkage member; and said valve ball is disposed on said support part.

\* \* \* \* \*